(12) United States Patent
Niedereder et al.

(10) Patent No.: US 6,308,558 B1
(45) Date of Patent: Oct. 30, 2001

(54) METHOD FOR CHECKING THE EFFECT OF SWIRL DUCTS IN MULTI-CYLINDER INTERNAL COMBUSTION ENGINES, IN PARTICULAR DIRECT INJECTION ENGINE

(75) Inventors: Werner Niedereder; Reinhard Ratzberger, both of Steyr; Johannes Dworschak, Haratzmuellerstrasse, all of (AT)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/355,109
(22) PCT Filed: Oct. 23, 1998
(86) PCT No.: PCT/EP98/06731
 § 371 Date: Sep. 20, 1999
 § 102(e) Date: Sep. 20, 1999
(87) PCT Pub. No.: WO99/27241
 PCT Pub. Date: Jun. 3, 1999

(30) Foreign Application Priority Data

Nov. 25, 1997 (DE) ............................................... 197 52 118

(51) Int. Cl.$^7$ .................................................. G01M 15/00
(52) U.S. Cl. ............................ 73/116; 73/117.3; 73/119 R
(58) Field of Search ................................... 73/116, 117.2, 73/117.3, 118.1, 119 R

(56) References Cited

U.S. PATENT DOCUMENTS

| | | | |
|---|---|---|---|
| 4,745,890 | * | 5/1988 | Wyczalek et al. . |
| 5,072,613 | * | 12/1991 | Baer et al. ........................ 73/119 R |
| 5,323,645 | * | 6/1994 | Endres et al. ...................... 73/118.1 |
| 5,653,202 | * | 8/1997 | Ma . |
| 5,670,715 | * | 9/1997 | Tomisawa ............................. 73/116 |
| 5,870,993 | * | 2/1999 | Stellet et al. . |
| 6,041,753 | * | 3/2000 | Lin et al. . |

FOREIGN PATENT DOCUMENTS

| | | |
|---|---|---|
| 26 13 275 | 10/1977 | (DE) . |
| 39 36 263 | 5/1990 | (DE) . |
| 195 35 486 | 12/1996 | (DE) . |
| 0 492 265 | 7/1992 | (EP) . |
| 0 725 210 | 8/1996 | (EP) . |

OTHER PUBLICATIONS

SAE Technical Paper Series, Feb. 25, 1991, pp. 1–12 entitled Effect of Intake Port Flow Pattern on the In–Cylinder Tumbling Air Flow in Multi–Valve SI Engines by S. Omori et al.

* cited by examiner

Primary Examiner—Eric S. McCall
(74) Attorney, Agent, or Firm—Crowell & Moring LLP

(57) ABSTRACT

In a method used for checking the effect of swirl ducts in multicylinder internal combustion engines, especially engines with direct injection, swirl numbers are determined with a swirl measuring device in a simultaneous cylinder that can be connected to a cylinder head and related to an engine-specific swirl tolerance band. With a sharp deviation of the swirl number from the swirl tolerance band as a function of the swirl number outside the swirl tolerance band, the corresponding swirl duct and/or filling channel in the cylinder head is subsequently made or designed to be smaller or larger in cross section in one duct section.

10 Claims, No Drawings

METHOD FOR CHECKING THE EFFECT OF SWIRL DUCTS IN MULTI-CYLINDER INTERNAL COMBUSTION ENGINES, IN PARTICULAR DIRECT INJECTION ENGINE

According to the preamble of claim 1, the invention relates to a method for checking the effect of swirl ducts in multicylinder internal combustion engines, especially engines with direct injection, in which a cylinder subjected to a vacuum, especially a simultaneous cylinder with a swirl measuring device, is associated on the combustion chamber side with a cylinder head with at least one swirl duct per cylinder, and a swirl number is assigned to each of the swirl flows per cylinder generated as a function of throughput by means of the swirl ducts and by an intake valve whose stroke can be varied. A swirl number determined by a formula from these cylinder-related swirl numbers is related to an engine-specific swirl tolerance band.

It is known that in cylinder heads that are produced by casting, including the swirl ducts, relatively slight deviations in the position of the core for shaping the swirl ducts result in extremely poor swirl results, with the disadvantage of a not insignificant number of cylinder head rejects. To check the quality and/or effect of the cast swirl ducts, the method according to the species is used as is known for example from DE 26 13 275 C. This method, used in particular for the development of a swirl duct, is used to determine an optimum swirl flow in the cylinder of different diaphragms movably associated with the swirl ducts, for individual swirl production in order eventually to be able to determine the geometry of the swirl duct. This document also teaches the usability of the method for a standard cylinder head with swirl ducts.

Another swirl measuring method using the device is known from DE 195 35 486 C; the intensity of the respective swirl is determined using a novel form of measurement technology. A cylinder head for a diesel engine is known from DE 40 18 065 A, said head having two intake passages located diametrically with respect to each cylinder, one of which passages being a swirl duct to produce swirl and the other also having a controllable throttle device. In addition, a cylinder head with two intake passages per cylinder is known from DE 39 36 263 A, with both a swirl duct and a filling channel being controlled by a common rotary valve. In addition, the other means known in engines with direct injection for influencing swirl, such as variable valve control, valve cutout, or a flap control provided in the intake, are too cumbersome for swirl correction on an individual cylinder basis.

The goal of the invention, when using the method according to the invention for swirl ducts with a fixed path, to develop measures for subsequent swirl correction for the individual cylinders.

This goal is achieved by claim 1 by virtue of the fact that depending on a swirl number outside the swirl tolerance band, the corresponding swirl channel in the cylinder head is subsequently made smaller or larger in cross section in a channel section.

Specifically, this is accomplished in a first embodiment of the invention in an advantageously simple fashion by the fact that when the swirl is too low according to a swirl number that falls below the swirl tolerance band, a bushing with a through flow cross section that is reduced relative to the other swirl duct cross section is provided subsequently to increase the swirl in the swirl ducts of the cylinder head, or/and a valve seat ring with a smaller inside diameter is used.

In a second embodiment according to the invention, it is proposed that when the swirl is too great according to a swirl number that exceeds the swirl tolerance band, to reduce the swirl, a constriction defined in the swirl duct is enlarged accordingly in the through flow cross section, or/and the inside diameter of a valve seat ring and/or the exit angle of the valve seat ring are increased, with the exit angle of the valve seat ring pointing in the swirl direction and possibly making a transition to a frustroconical depression in the bottom of the cylinder head on the combustion chamber side.

With the measures according to the invention outlined above, the swirl flow is corrected on a individual cylinder basis in simple fashion and therefore the number of cylinder head rejects is reduced and, in an engine with direct injection, combustion is made uniform in all of the cylinders, with the advantage of reduced fuel consumption and improved exhaust quality.

An especially advantageous re-working solution is achieved with a swirl duct associated with each cylinder in the cylinder head, with a duct path in the cylinder head that is essentially parallel to the cylinder axis. A channel section formed in this channel in simple fashion allows either a subsequent enlargement of the cross section or a subsequent use of a bushing with a reduced through flow cross section in an advantageous manner. In a channel path parallel to the cylinder axis, a duct portion can advantageously be provided there according to the invention by machining using chip removal, simply either for a subsequent increase in the cross section or to use a bushing with a reduced through flow cross section.

The invention is described below.

In a method for checking the effect of swirl ducts located in a cast cylinder head for a multicylinder internal combustion engine, especially an engine with direct injection, a cylinder subjected to a vacuum, especially a simultaneous cylinder with a swirl measuring device, is associated with a cylinder head on the combustion chamber side, said head having at least one swirl duct per cylinder. For the known checking method, the swirl measuring device can be operated either with the aid of windmill-type anemometry or according to the moment measurement method known from DE-C 26 13 275. The intake valve that can be adjusted by the swirl ducts and by an intake valve with an adjustable stroke, preferably a maximum valve stroke and a $\frac{2}{3}$ maximum valve stroke, throughput-dependently generated swirl flows per cylinder are each assigned a swirl number, with a swirl number determined by formula from these cylinder-related swirl numbers being related to an engine-specific swirl tolerance band.

In a cylinder head checked according to the above method, in order to be able to perform a swirl correction of a defect caused for example by a defective core position for a swirl duct, subsequently for each cylinder of the engine, according to the invention, as a function of a swirl number outside the swirl tolerance band, the cross section of the respective swirl duct in the cylinder head is subsequently designed or made accordingly smaller or larger in a duct section.

If the swirl is too low according to a swirl number that undershoots the swirl tolerance band, preferably a bushing with a through flow cross section reduced relative to the rest of the swirl duct cross section is subsequently provided to increase the swirl in the duct of the cylinder head. In addition, a valve seat ring is also provided as a channel section that replaces one with a smaller inside cross section to increase the swirl. Each of these measures can be used alone or in combination for the desired increase in swirl.

On the other hand, if a swirl is obtained that is too strong according to a swirl number that exceeds the swirl-tolerance band, forcing reduction of the swirl, according to one preferred measure according to the invention, a constriction made in the swirl duct in the through flow cross section can subsequently be enlarged accordingly. In addition, by itself or in combination with this measure, the inside diameter of a valve seat ring and/or its exit angle can subsequently be enlarged, with the exit angle of the valve seat ring pointing in the swirl direction being designed to merge with a frustroconical depression in the bottom of the cylinder head on the combustion chamber side.

A swirl-dependent duct cross section change according to the invention is used advantageously in a swirl duct which, upstream of an inlet opening controlled by a valve and preferably located pointing in the swirl direction, has a duct path in the cylinder head that is essentially parallel to the cylinder axis, with a duct section designed so that either a subsequent increase in cross section or a subsequent insertion of a bushing with reduced through flow cross section are produced by suitable simply performed chip-removing machining of the channel section.

The swirl-dependent duct cross section change according to the invention can also be used in each cylinder in the cylinder head in addition to the filling channel also provided and preferably running transversely to the cylinder axis.

With the finishing work according to the invention for each swirl channel and/or filling channel, the number of cast cylinder head rejects can be significantly reduced, so that with the subsequent swirl correction, especially in the lower load range, combustion is considerably improved, along with the advantage of improved exhaust quality.

What is claimed is:

1. A method for checking the effect of and correcting swirl ducts in a multicylinder internal combustion engine, the method comprising the acts of:

producing a swirl flow in a cylinder, subjected to a vacuum and having a swirl measuring device, said swirl measuring device being arranged on a combustion chamber side of a cylinder head wherein each cylinder head of said engine has at least one swirl duct;

associating a cylinder-related swirl number with the swirl flow in each cylinder;

determining a swirl number by formula from the cylinder-related swirl numbers thereby bringing the swirl number into a relationship with an engine-specific swirl tolerance band; and providing the associated swirl duct in the cylinder head with a swirl duct section whose cross section is adjustable to be made smaller or larger in accordance with whether the swirl number is outside the swirl tolerance band.

2. The method according to claim 1, further comprising at least one of the acts of:

providing a bushing with a through flow cross section reduced relative to the swirl duct cross section to increase the swirl in the swirl duct of the cylinder head when the cylinder related swirl number undershoots the swirl tolerance band; and using a valve seat ring with a smaller inside diameter to increase the swirl in the swirl duct of the cylinder head when the swirl number undershoots the swirl tolerance band.

3. The method according to claim 1, further comprising at least one of the acts of:

increasing a through flow cross section of a constriction defined in the swirl duct to reduce the swirl when the cylinder related swirl number overshoots the swirl tolerance band; and enlarging at least one of an inside diameter and an exit angle of a valve seat ring when the cylinder related swirl number overshoots the swirl tolerance band with the exit angle of the valve seat ring pointing in a swirl direction and making a transition to a frustroconical depression in the bottom of the cylinder head on the combustion chamber side.

4. The method according to claim 2 wherein a swirl-dependent duct cross section change is used in the swirl duct associated with each cylinder in the cylinder head, said duct having, upstream of a valve-controlled intake opening located such that said opening points in a swirl direction, a path for the duct in the cylinder head that is essentially parallel to a cylinder axis, with a duct section designed so that either the size of the cross section can be increased subsequently or a bushing with a reduced through flow cross section can be inserted subsequently.

5. The method according to claim 3, wherein a swirl-dependent duct cross section change is used in a swirl duct associated with each cylinder in the cylinder head;

said duct having, upstream of a valve-controlled intake opening located such that said opening points in a swirl direction, a path for the ducts in the cylinder head that is essentially parallel to a cylinder axis, with a duct section designed so that either the size of the cross section can be increased subsequently or a bushing with a reduced through flow cross section can be inserted subsequently.

6. The method according to claim 1, further comprising the act of using a swirl-dependent duct cross section change in a filling channel additionally provided for each cylinder in the cylinder head.

7. The method according to claim 1, wherein the engine is a direct injection engine.

8. The method according to claim 6, wherein the filling channel extends transversely to the cylinder axis.

9. An apparatus for checking the effect of and correcting swirl ducts in a multicylinder internal combustion engine, comprising:

a cylinder subjected to a vacuum, having a swirl measuring device, the cylinder being positioned on a combustion chamber side of a cylinder head wherein each cylinder head of the engine has at least one swirl duct per head cylinder;

means for generating a cylinder-related swirl number which is associated with a swirl flow in each cylinder produced as a function of throughput by the swirl duct and by an intake valve whose stroke can be adjusted;

means for generating a swirl number determined by a formula from said cylinder-related swirl numbers being brought into a relationship with an engine-specific swirl tolerance band; and means for providing the associated swirl duct in the cylinder head with a duct section whose cross section is adjustable to be made smaller or larger as a function of a swirl number outside the swirl tolerance band.

10. A method for checking and correcting swirl duct effects in a multicylinder internal combustion engine having direct injection, the method comprising the acts of:

producing a swirl flow as a function of throughput by a swirl duct for a cylinder of the engine and by an intake valve having an adjustable stroke;

comparing the produced swirl flow with an engine-specific swirl tolerance band; and modifying the swirl duct in the cylinder head to have either a smaller or larger duct cross-section depending on the relationship between the produced swirl flow and the swirl tolerance band.

* * * * *